US012603013B2

(12) United States Patent
Nilsson et al.

(10) Patent No.: US 12,603,013 B2
(45) Date of Patent: Apr. 14, 2026

(54) METHODS OF ROUTE DIRECTING UNMANNED AERIAL VEHICLES

(71) Applicant: Telefonaktiebolaget LM Ericsson (publ), Stockholm (SE)

(72) Inventors: Andreas Nilsson, Gothenburg (SE); Jonas Fridén, Mölndal (SE); Fredrik Harrysson, Gothenburg (SE); Lars Manholm, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 380 days.

(21) Appl. No.: 16/309,744

(22) PCT Filed: Jun. 21, 2016

(86) PCT No.: PCT/EP2016/064306
§ 371 (c)(1),
(2) Date: Dec. 13, 2018

(87) PCT Pub. No.: WO2017/220130
PCT Pub. Date: Dec. 28, 2017

(65) Prior Publication Data
US 2019/0139421 A1 May 9, 2019

(51) Int. Cl.
*G08G 5/55* (2025.01)
*B64U 101/20* (2023.01)
(Continued)

(52) U.S. Cl.
CPC .............. *G08G 5/55* (2025.01); *G05D 1/106* (2019.05); *G08G 5/22* (2025.01); *G08G 5/26* (2025.01);
(Continued)

(58) Field of Classification Search
CPC .... G08G 5/006; G08G 5/0013; G08G 5/0026; G08G 5/0039; G08G 5/0069;
(Continued)

(56) References Cited

U.S. PATENT DOCUMENTS 9,313,667 B1  4/2016 Daoura
2004/0189524 A1* 9/2004 Saucier ................. H01Q 3/267
342/174
(Continued)

FOREIGN PATENT DOCUMENTS

FR        3 027 815 A1    5/2016
WO     2015/157883 A1   10/2015

OTHER PUBLICATIONS

International Search Report and Written Opinion dated Mar. 6, 2017 issued in International Application No. PCT/EP2016/064306. (11 pages).

*Primary Examiner* — Andrew J Cromer
(74) *Attorney, Agent, or Firm* — Rothwell, Figg, Ernst & Manbeck, P.C.

(57) ABSTRACT

A method (50) of route directing performed in an unmanned aerial vehicle (8a) is provided. The unmanned aerial vehicle (8a) comprises a communication module (9a) for wireless communication with an access node (2a, 2b) of a communications system (1). The method (50) comprises receiving (51), from a network entity (11), warning signaling about a restricted area, and withdrawing (52) from the restricted area in response to receiving the warning signaling. A method (20) in a network entity (11) is also provided, as well as an unmanned aerial vehicle (8a), a network entity (11), computer programs and computer program products.

6 Claims, 3 Drawing Sheets

(51) Int. Cl.

| | |
|---|---|
| *G05D 1/00* | (2024.01) |
| *G08G 5/22* | (2025.01) |
| *G08G 5/26* | (2025.01) |
| *G08G 5/34* | (2025.01) |
| *G08G 5/57* | (2025.01) |
| *G08G 5/59* | (2025.01) |

(52) U.S. Cl.
CPC ................. *G08G 5/34* (2025.01); *G08G 5/57* (2025.01); *G08G 5/59* (2025.01); *B64U 2101/20* (2023.01); *B64U 2201/10* (2023.01)

(58) Field of Classification Search
CPC ...... G08G 5/0017; G05D 1/106; G05D 1/101; B64C 39/024
See application file for complete search history.

(56) References Cited

U.S. PATENT DOCUMENTS

| | | | | |
|---|---|---|---|---|
| 2008/0306680 | A1 | 12/2008 | Marty et al. | |
| 2011/0299460 | A1 | 12/2011 | Tarokh et al. | |
| 2014/0032034 | A1* | 1/2014 | Raptopoulos | G05D 1/0088 701/25 |
| 2016/0012730 | A1 | 1/2016 | Jarrell | |
| 2016/0116912 | A1 | 4/2016 | Nehmadi et al. | |
| 2016/0240087 | A1* | 8/2016 | Kube | G08G 5/006 |
| 2016/0291589 | A1* | 10/2016 | Ashoori | G01S 19/13 |
| 2017/0148332 | A1* | 5/2017 | Ziemba | H04W 76/10 |

* cited by examiner

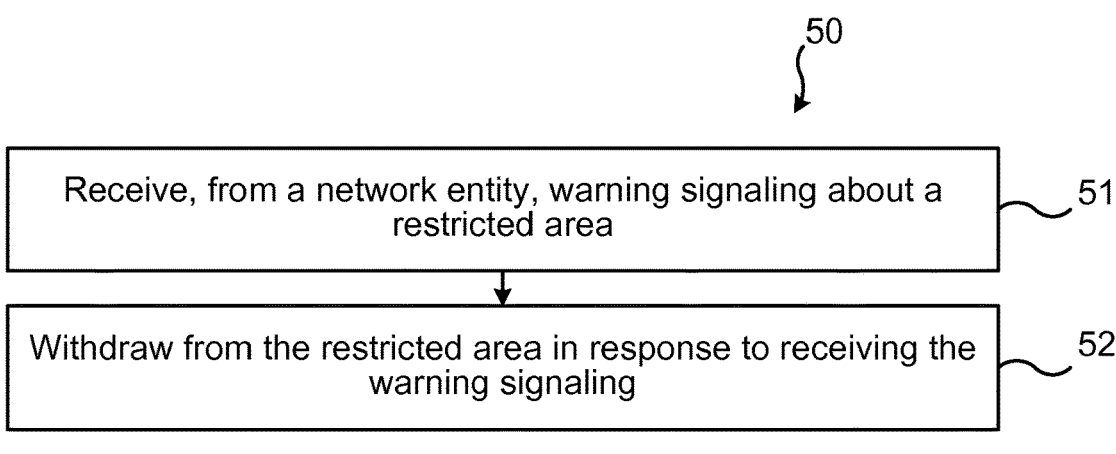

50

| Receive, from a network entity, warning signaling about a restricted area | 51 |

| Withdraw from the restricted area in response to receiving the warning signaling | 52 |

Fig. 7

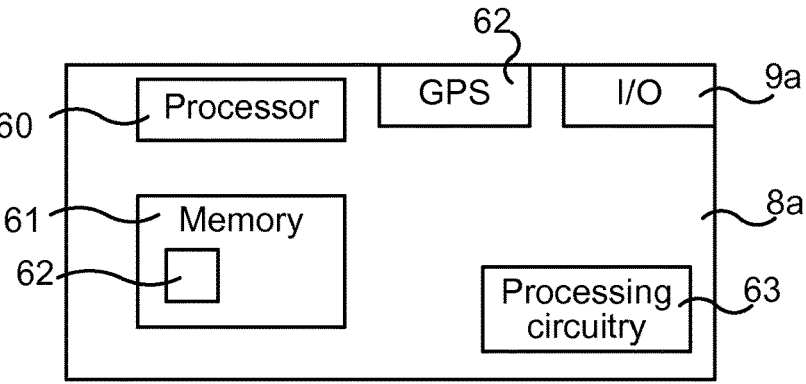

62

60 — Processor     GPS     I/O — 9a

61 — Memory                          8a

62 —                     Processing circuitry — 63

Fig. 8

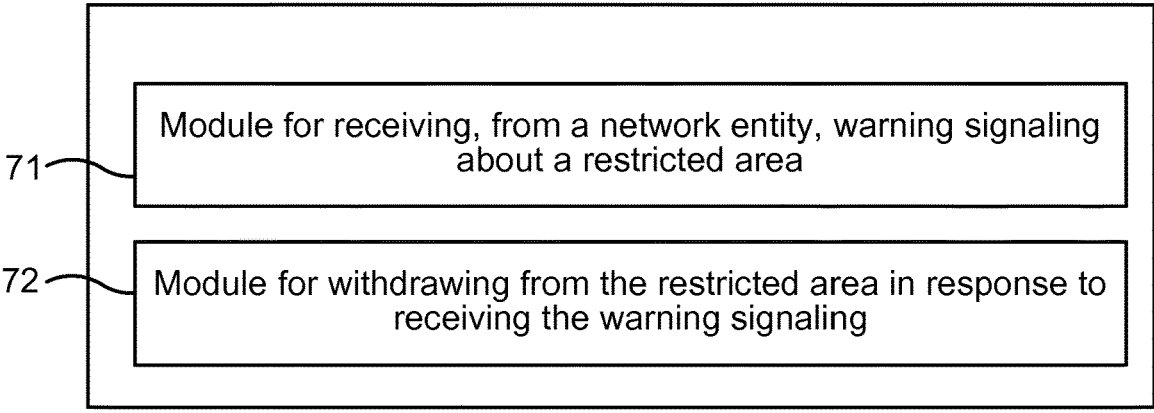

71 — Module for receiving, from a network entity, warning signaling about a restricted area 72 — Module for withdrawing from the restricted area in response to receiving the warning signaling

Fig. 9

METHODS OF ROUTE DIRECTING UNMANNED AERIAL VEHICLES

CROSS REFERENCE TO RELATED APPLICATION(S)

This application is a 35 U.S.C. § 371 National Stage of International Patent Application No. PCT/EP2016/064306, filed Jun. 21, 2016, designating the United States.

TECHNICAL FIELD

The technology disclosed herein relates generally to the field of unmanned aerial vehicles, and in particular to a method of route directing performed in an unmanned aerial vehicle, method of route directing unmanned aerial vehicles performed in a network entity, unmanned aerial vehicle, network entity, computer programs and computer program products.

BACKGROUND

Unmanned aerial vehicles (UAV), often denoted drones, are becoming more and more common and used for various purposes. Examples of use cases for drones are, for instance, aerial surveillance, professional aerial surveying, commercial and motion picture filmmaking, news gathering for journalism, observation by police forces, search and rescue operations, scientific research, disaster relief, cargo transportation etc. The small unmanned-aircraft-systems are rapidly becoming a large market, including services and applications.

With the increasing amount of unmanned aerial vehicles in use various challenges arise.

SUMMARY

In the future there might be many drones up in the air, for example carrying cargo and hence traveling to different places in cities. One challenge is then to ensure that the drones do not fly around randomly in chaos, for instance, colliding with each other or flying into restricted areas. A drone entering, for instance, areas close to an airport may lead to airplanes having to postpone their landing or takeoff. Another problem is drones breaching people's personal integrity, for instance, when drones carrying cameras fly over their houses. Further, drones flying over crowded places might increase risk of people getting hurt in case of drone failure, etc.

An objective of the present disclosure is to address and improve various aspects in view of unmanned aerial vehicles. A particular objective is to enable and ensure safe use of such unmanned aerial vehicles traffic. Another particular objective is to reduce risk of such unmanned aerial vehicles entering restricted areas. These objective and others are achieved by the methods, devices, computer programs and computer program products according to the appended independent claims, and by the embodiments according to the dependent claims.

The objective is according to an aspect achieved by a method of route directing performed in an unmanned aerial vehicle, the unmanned aerial vehicle comprising a communication module for wireless communication with an access node of a communications system. The method comprises receiving, from a network entity, warning signaling about a restricted area, and withdrawing from the restricted area in response to receiving the warning signaling.

The method provides many advantages. An advantage of the method is that the drone is prevented from entering restricted and prohibited areas such as e.g. airports. By being able to receive warning signaling from a communications system there the drone does not have to be provided with a pre-downloaded map. Further, the method enables flexibility in that temporary changes to prohibited flight zones, e.g., at occasional events or emergency situations that require flight restrictions, can be easily handled by redirecting the drones.

The objective is according to an aspect achieved by a computer program for an unmanned aerial vehicle for route direction. The computer program comprises computer program code, which, when executed on at least one processor on the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle for route directing, the unmanned aerial vehicle comprising a communication module for wireless communication with an access node of a communications system. The unmanned aerial vehicle is configured to: receive, from a network entity, warning signaling about a restricted area, and withdraw from the restricted area in response to receiving the warning signaling.

The objective is according to an aspect achieved by a method of route directing unmanned aerial vehicles. The method is performed in a network entity of a communications system and comprises transmitting, to an unmanned aerial vehicle, warning signaling about a restricted area, the unmanned aerial vehicle comprising a communication module for wireless communication with an access node of the communications system.

The method provides many advantages. An advantage of the method is that drones may be redirected e.g. based on current weather situation or other more or less unexpected events. Instead of, or as complement to, having pre-computed routes for e.g. long distance transports the operator is enabled to redirect the drones.

In contrast to existing systems, which rely on static and possibly outdated and inaccurate maps, the method according to the present teachings provides flexibility to include all geographic areas that might raise concerns. The method allows restricted areas to be updated in real time, for example in case of an event, such as an ad hoc demonstration or other crowd, or in case of an accident to mention a few examples.

The objective is according to an aspect achieved by a computer program for a network entity for route directing unmanned aerial vehicles. The computer program comprises computer program code, which, when executed on at least one processor on the network entity causes the network entity to perform the method as above.

The objective is according to an aspect achieved by a computer program product comprising a computer program as above and a computer readable means on which the computer program is stored.

The objective is according to an aspect achieved by a network entity of route directing unmanned aerial vehicles. The network entity is part of a communications system and is configure to: transmit, to an unmanned aerial vehicle, warning signaling about a restricted area, the unmanned aerial vehicle comprising a communication module for wireless communication with an access node of the communications system.

Further features and advantages of the embodiments of the present teachings will become clear upon reading the following description and the accompanying drawings.

BRIEF DESCRIPTION OF THE DRAWINGS

FIG. 7 illustrates a flow chart over steps of an embodiment of a method in an unmanned aerial vehicle in accordance with the present teachings.

FIG. 8 illustrates schematically an unmanned aerial vehicle and means for implementing embodiments of the method in accordance with the present teachings.

FIG. 9 illustrates an unmanned aerial vehicle comprising function modules/software modules for implementing embodiments of the present teachings.

DETAILED DESCRIPTION

Figures 1, 2, 3:
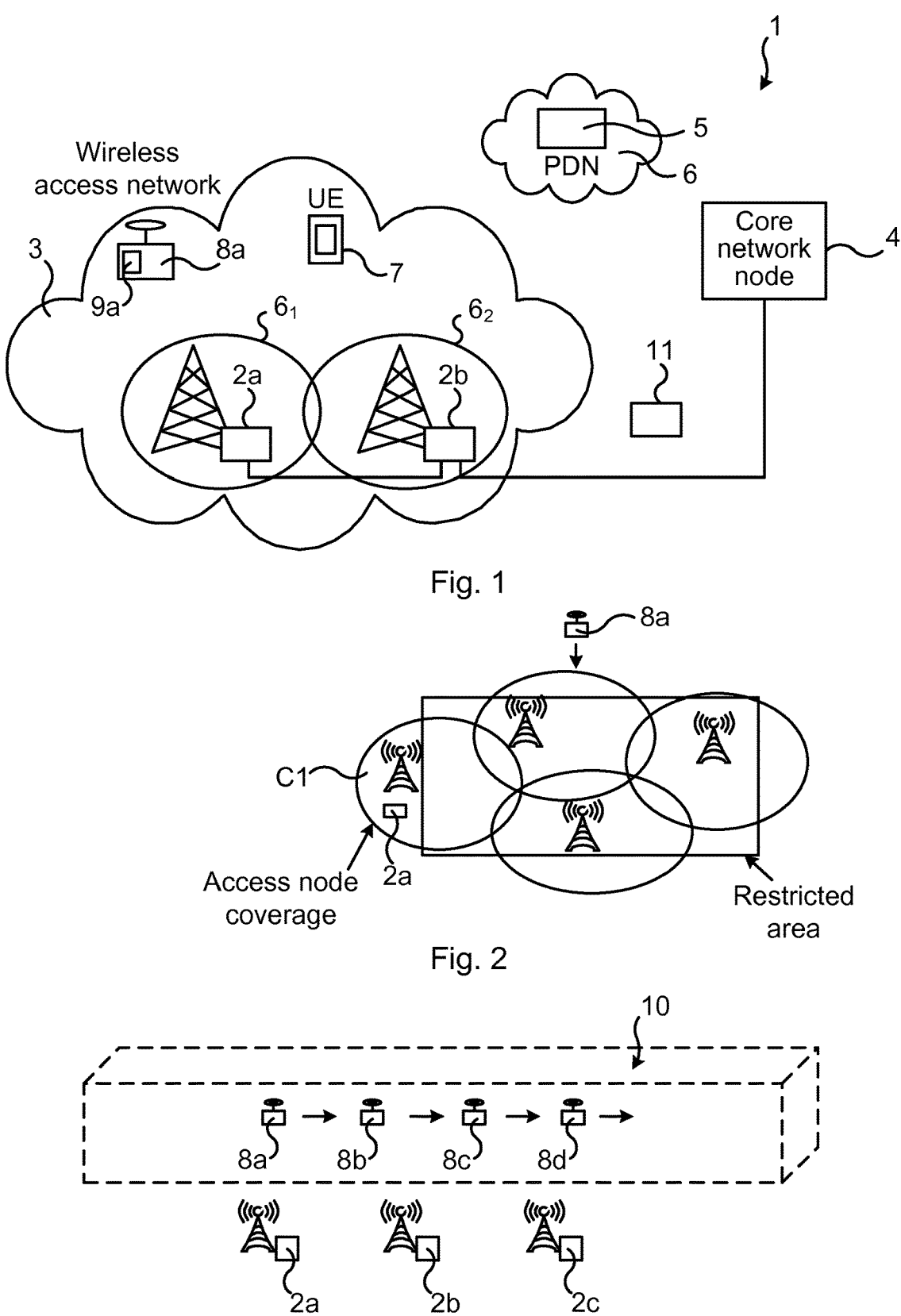
FIG. 1 illustrates schematically an environment in which embodiments according to the present teachings may be implemented.
FIG. 2 illustrates an exemplary use case.
FIG. 3 illustrates an example of a virtual road according to the present teachings.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, methods and means are provided for preventing unmanned aerial vehicle (also denoted drones in the following) from entering restricted areas, and also for controlling drone traffic, e.g. by creating virtual roads. The drones are equipped with a communication unit such that they are able to communicate in a communications system e.g. over a cellular radio access network, for example Long Term Evolution (LTE) or 5G. The communications system (a node or device thereof) and/or a dedicated warning system at, e.g. an airport may broadcast warning signals informing drones that they are about to enter or have entered a restricted area. Such warning signals may, for instance, be broadcast continuously rather frequently (e.g. every second). This enables the drones to change route and avoid entering the restricted area or exiting it as quickly as possible.

In some embodiments, a node of the communications system may use a connection established with the drone to inquiring its position. In other embodiments, known communications system positioning (for example triangulation) is used in order to determine the position of the drone. Signals are transmitted that will inform drones that this is a restricted area and that they have to move out of the area if having entered or moving farther away if being too close. In some embodiments, the method may also give the drone an alternative way to its intended destination without entering the restricted area. In other embodiments, a node (e.g. radio access node) of the communications system signals Global Positioning System (GPS) coordinates of the restricted area to the drone and the drone may then itself find a proper path to its intended destination without entering the restricted area. The restricted area can include any direction: longitude, latitude and altitude.

FIG. 1 illustrates schematically an environment in which embodiments according to the present teachings may be implemented. A communications system 1 is illustrated comprising a number of network nodes. The communications system 1 may, for instance, comprise a 2G, 3G, 4G or 5G network. The communications system 1 comprises a wireless access network 3, in turn comprising a number of network nodes 2a, 2b (e.g. radio access nodes). The communications system 1 may also comprise core network nodes 4 (also denoted backbone nodes). The communications system 1 may comprise, have access to or be interconnected with other network elements, for instance, network nodes 5 of a packet data network 6, such as Internet.

The network node 2a, 2b may provide and control one or more respective coverage area(s), often denoted cell C1, C2. Further, the network node 2a, 2b may have wireless communication with drones 8a having a communication module for receiving such signaling and possibly transmitting signaling according to the access technology at hand. The access nodes 2a, 2b may implement different wireless access technologies, such as 3G, 4G, LTE or 5G, to mention a few examples. Further, the network node 2a, 2b may be denoted in different ways depending on standards implemented in the communications system 1. For instance, while an access node handling the wireless communication with devices is known as base transceiver station (BTS) in Global System for Mobile Communications (GSM), it is known as evolved Node B or eNB in Long Term Evolution (LTE) systems. These network nodes 2a, 2b, in the following are denoted access nodes 2a, 2b, communicate wirelessly with e.g. user equipment (UE) 7. The access nodes 2a, 2b may also, according to embodiments of the present teachings, communicate wirelessly with drones 8a equipped with a communication module 9a adapted to the standard used in the communications system 1. The drone communication can be based, for instance, on LTE (or 5G), on Vehicle-to-everything (V2X) communication, or similar with both network assisted and direct Device-to-Device (D2D) communication.

A network entity 11 is provided in the communications system 1 for preventing drones from entering restricted areas. The network entity 11 may also be configured to keep track of drones 8a that are equipped with the communication module 9a. In other embodiments, a first network entity 11 is provided for preventing drones from entering restricted areas, and another network entity for keeping track of the drones 8a, e.g. by creating virtual roads.

Many different embodiments of the method according to the present teachings may be implemented in the network entity 11. Further, the network entity 11 may be a standalone device or be part of the access nodes 2a, 2b, in a Base Station Controller (BSC) or correspondingly (for LTE) Radio Network Controller (RNC), and Mobile Switching Center (MSC) or correspondingly (for LTE) Mobility Management Entity (MME), or in a gateway providing connectivity to packet data networks (PDNs) 6 such as e.g. Internet. Examples of such gateways comprise (for LTE) Packet Data Network Gateway (PDN-GW) and (for 2G and 3G systems) Gateway GPRS support node (GGSN). It is noted that there are various other network nodes, not mentioned here. It is further noted that the present teachings are not limited to a particular access technology.

FIG. 2 illustrates an exemplary use case. A restricted area (for example an airport) is illustrated as a rectangle and the coverage areas of one or more access nodes 2a (only one shown) located in the area are illustrated by circles. The communications system 1, e.g. the access nodes 2a thereof, may broadcast warning signals informing any drones 8a that are coming into or close to the restricted area to not go any further in to the restricted area. In some embodiments, the coverage of the broadcasted warning signal is further shaped to align with the restricted area. This can be done for example by applying complex weights on the different access node 2a, 2b antenna elements and/or changing the output power of the warning signal of one or several access nodes 2a, 2b. The weights and output power can be updated continuously (or regularly or upon need) by using information of the positions of the drones responding that they have received the warning signal. The warning signals may, in other embodiments, not be broadcasted; they may instead be dedicated to one specific drone 8a. For example, the communications system 1 may first detect (e.g. by cellular positioning) that a drone 8a is entering the restricted area and then send dedicated warning signals to that drone 8a by means of the access nodes 2a.

There are many possible actions to take in order to ensure that the drone 8a does not travel deeper into the restricted area. One way is to make sure that the drone 8a goes back the same way it came. When the drone 8a has backed off a certain distance it can try to find an alternative route to its destination.

To facilitate for the drone 8a to find a new route to its destination without entering the restricted area the network entity 11 can transmit, via the access node 2a, the coordinates of the restricted area to the drone 8a. The drone 8a can then use these coordinates when calculating (itself) the new route. In other embodiments, the drone 8a signals the coordinates of its destination to the network entity 11 (via nodes in the communications system 1). The network entity 11 may then calculate a new route for the drone 8a and then signal this route to the drone. This has the advantage of the drone 8a requiring less processing capacity and memory, rendering it less costly.

In some embodiments the warning signals are standardized and compulsory for all drones. In such case, when a drone 8a enters a restricted area the network entity 11 (and/or nodes of the communications system 1) can take temporarily control of the drone 8a and move it out of the restricted area. This will reduce the risk of drones entering the restricted areas even further.

In some embodiments, virtual (three dimensional) roads in the air may be used for providing a structured and controlled transport of the drones. The network entity 11 and the communications system 1 may be involved in the traffic control and creation of virtual roads or flight channels in the air, in which the drones can travel. These embodiments may also ensure that the drones indeed travel in these virtual roads. The method according to these embodiments may be implemented in an Internet based solution (so called "cloud" solution) and the drones may be provided with drone sensors for autonomous or network directed operation. Advantages provided by such embodiments, are increased drone transport safety and efficiency as well as cargo logistics. The drone communication may, as mentioned earlier, be based, for instance, on LTE (or 5G) Vehicle-to-everything (V2X) communication.

The network entity 11 may be used also for defining such virtual roads in the air. The network entity 11 may keep track of any drones that are equipped with the communication module 9a. An advantage is that the drones will travel in more order, which will reduce the risk of accidents and collisions, and with the opportunity to improve cargo delivery control, logistics, and transport efficiency. Further, there is no need for new infrastructure and/or influence by air traffic control operators.

FIG. 3 illustrates an example of the above described virtual roads. In particular a virtual road to according to the present teachings is illustrated. In the illustrated example, the network entity 11 of the communications system 1 (or separate network entity implementing only the aspect of virtual roads) has defined a three dimensional road to as illustrated in dashed lines. The virtual roads 10 may be defined in different ways. For instance, when defining virtual roads consideration may be taken to how densely populated a certain area is and also based on knowledge on restricted areas. The virtual roads may then be created and defined such that the virtual roads should avoid passing over these areas. These virtual roads may be considered fixed or predetermined. The virtual roads 10 may be based, for instance, on one or more of: maps, knowledge about surroundings, events, crowds, ad-hoc demonstrations and other real-time information obtained from different sources. The virtual roads 10 may be updated continuously, regularly and/or instantaneously upon need.

In some embodiments, the defined virtual roads 10 are used and the drones 8a, 8b, 8c, 8d have to be guided along these roads. In other embodiments, a flexibility is provided in that new virtual roads or one-time-routes may be created, e.g. due to an ad-hoc demonstration taking place in an area traversed by the already defined virtual road.

In some embodiments, each drone 8a, 8b, 8c, 8d signals its destination to the network entity 11. Based at least on these destinations, the network entity 11 determines, e.g. calculates, a respective route for the respective drone 8a, 8b, 8c, 8d. New virtual roads 10 may be defined based on this e.g. if current circumstances are such that no existing virtual road can be used. In other instances, when having the destinations the routes may be selected (entirely) based on the existing, already defined virtual roads. In either case, the network entity 11 may then signal the route back to the drone 8a, 8b, 8c, 8d. In such network implementation, it should be mandatory for the traveling drones 8a, 8b, 8c, 8d to send the coordinates of their destination and to receive coordinates of their route by the network entity 11. If the network entity 11 does not have information on all existing drones, then accidents may happen anyway. Correspondingly, it should then also be mandatory for the drones 8a, 8b, 8c, 8d to follow the coordinates given by the network entity.

In some embodiments, the network entity 11 signals the coordinates of the defined virtual roads 10 to the drone 8a, 8b, 8c, 8d and the drone 8a, 8b, 8c, 8d itself calculates the route to its destination such that it travels within the virtual roads 10. In this context it is noted that the drones 8a, 8b, 8c, 8d may be equipped with e.g. proximity sensors, radars etc. for avoiding collisions with other drones within the assigned virtual roads.

The coordinates of the virtual roads 10 may, just as the warning signaling, be communicated, i.e. signaled, to the drones 8a, 8b, 8c such that they travel only within these roads 10.

The position of the drones 8a, 8b, 8c, 8d may be obtained in different ways. For instance, the drones 8a, 8b, 8c, 8d, may comprise a GPS device and the network entity 11 may then receive GPS signaling from the drones 8a, 8b, 8c, 8d possibly via other network nodes (such as the access nodes 2a, 2b, 2c). As another example, the position of the drones 8a, 8b, 8c, 8d may be obtained by performing a so-called triangulation from the access nodes 2a, 2b, 2c, wherein distances from three access nodes to the drone are estimated and used for positioning.

In one embodiment the network entity 11 keeps track of the positions of the drones 8a, 8b, 8c, 8d and signals to any drone 8a, 8b, 8c, 8d in case they depart from the virtual roads 10. One way to keep track of the drones 8a, 8b, 8c, 8d is to request the drones 8a, 8b, 8c, 8d to continuously signal their GPS coordinates, e.g., by Cooperative Awareness Message (CAM) and Decentralized Environmental Notification Message (DENM) as in Dedicated short-range communications (DSRC) or Intelligent Transportation Systems (ITS-G5) standards. Another way is to use triangulation of signals transmitted between access nodes 2a, 2b, 2c and the drones CAM.

In some embodiments, two adjacent virtual roads are provided, wherein one is used for a first direction and another is used for the opposite direction. The drones 8a, 8b, 8c, 8d may then safely travel in each direction between a starting point (e.g. a drone parking station) and a destination point (e.g. a cargo drop-off point).

In some embodiments the virtual roads 10 are defined such that they avoid areas where there are much people, for example market-places etc. This feature reduces the risk of accidents in case of drone failures. The virtual roads 10 may also be defined such as to avoid restricted areas.

In yet other embodiments, the network entity 11 evaluates in real time where there are high density of users and adapts the virtual roads 10 in the air accordingly in order to avoid or at least minimize the risk of drones 8a, 8b, 8c, 8d flying over crowds, which could lead to accidents in case of drone failures. Such real-time evaluation may use information available in the communications system 1. For instance, the high density of users can be based on number of user equipment such as smart phones residing in a certain area.

In some embodiments, the provided method may provide assistance to the drones 8a, 8b, 8c, 8d by directing routes and controlling "traffic signs" at crossings. At long distance transport the access nodes 2a, 2b may act as a low height alternative to the radar beacon system used for air traffic control.

The various features and embodiments that have been described may be combined in many different ways, examples of which are given in the following, with reference first to FIG. 4.

Figures 4, 5, 6:
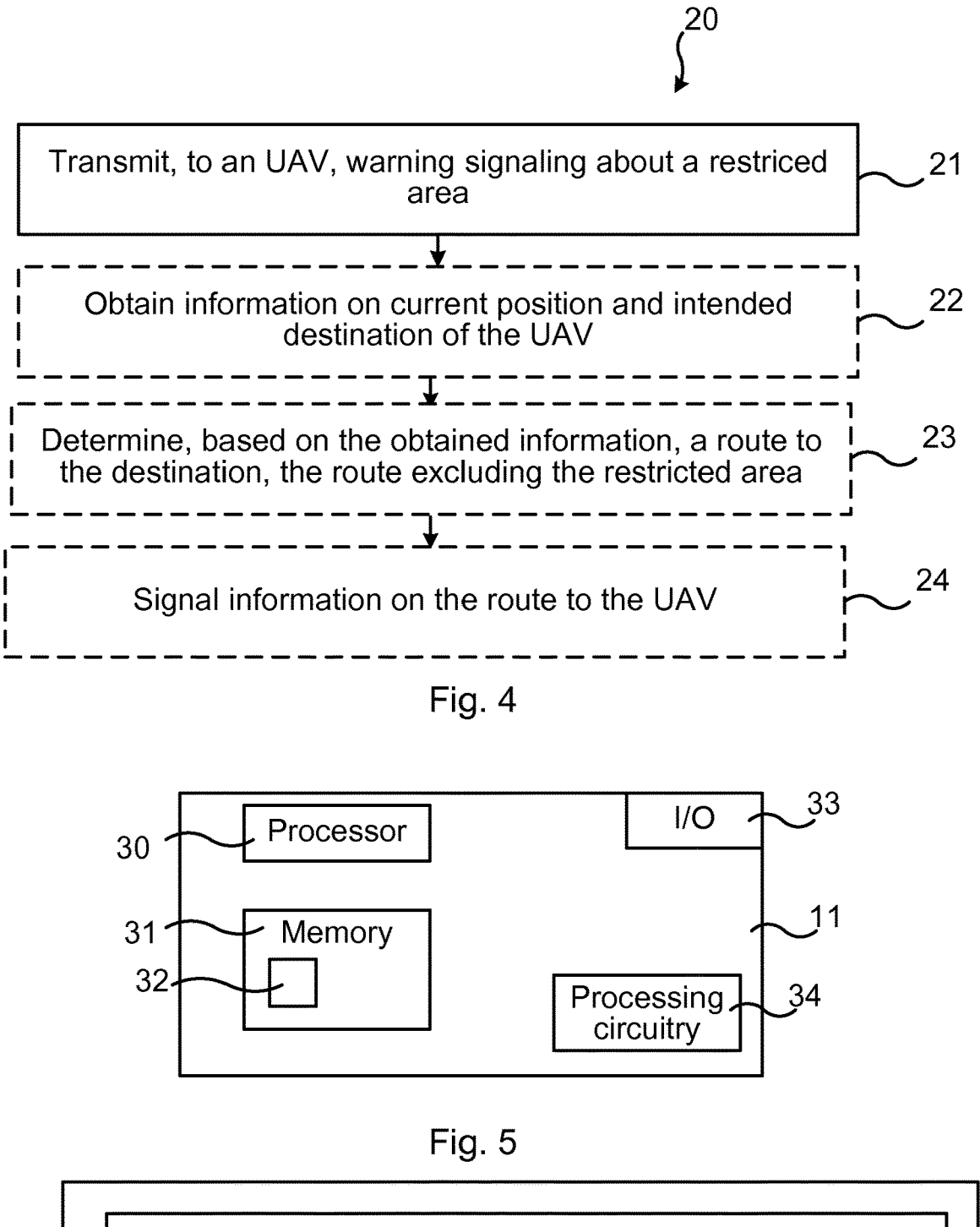
FIG. 4 illustrates a flow chart over steps of an embodiment of a method in a network entity in accordance with the present teachings.
FIG. 5 illustrates schematically a network entity and means for implementing embodiments of the method in accordance with the present teachings.
FIG. 6 illustrates a network entity comprising function modules/software modules for implementing embodiments of the present teachings.

FIG. 4 illustrates a flow chart over steps of an embodiment of a method in a network entity in accordance with the present teachings. The method 20 of route directing unmanned aerial vehicles may be performed in a network entity 11 being part of or cooperating with a communications system 1, as has been described (e.g. in relation to FIG. 1).

The method 20 comprises transmitting 21, to an unmanned aerial vehicle 8a, warning signaling about a restricted area, the unmanned aerial vehicle 8a comprising a communication module 9a for wireless communication with an access node 2a, 2b of the communications system 1.

The transmitting 21 may be performed in response to the network entity 11 detecting the existence of the unmanned aerial vehicle 8a, or the transmitting may comprising broadcasting, e.g. continuously, such warning signals. The communications system 1 may, for instance, comprise a 3G, LTE or 5G system and the signals thus conforming to corresponding standards.

In an embodiment, the method 20 comprises:

obtaining 22 information on a current position and an intended destination of the unmanned aerial vehicle 8a, determining 23, based on the obtained information, a route to the destination, the route excluding the restricted area, and signaling 24 information on the route to the unmanned aerial vehicle 8a.

These steps are optional, as indicated by the corresponding boxes of FIG. 4 being drawn with dashed lines.

In another embodiment, the method 20 comprises:

receiving, from the unmanned aerial vehicle 8a, a request for geographical information on the restricted area, and sending, in response to the request, the geographical information on the restricted area to the unmanned aerial vehicle 8a.

In various embodiments, the method 20 comprises transmitting, to the unmanned aerial vehicle 8a, coordinates of at least one virtual road 10 in airspace along which the unmanned aerial vehicle 8a is to travel.

In various embodiments, the method 20 comprises obtaining a current position of and a destination for the unmanned aerial vehicle 8a, and determining a route along which the unmanned aerial vehicle 8a is to travel based on the current position, the destination and on predefined virtual roads in airspace.

The current position of the unmanned aerial vehicle 8a may, for instance, be obtained by simply receiving, from the unmanned aerial vehicle 8a, its GPS coordinates. As another example, the current position of the unmanned aerial vehicle 8a may be obtained by requesting access nodes 2a, 2b, 2c of the communications system 1 to perform a triangulation and receiving the position as a response to the request.

In a variation of the above embodiment, the determining is further based on one or more of: information on ad hoc demonstrations, information on weather conditions, information on crowds, information on location of other unmanned aerial vehicles 8a, 8b, 8c, 8d and information on traffic accidents.

In different embodiments, the transmitting 21 the warning signaling comprises broadcasting the warning signaling using a beamforming method. As has been described earlier, complex weights may be applied on different antenna elements of the access node 2a. In still other embodiments, or in combination with the beamforming, the output power of the warning signaling may be changed, e.g. the output power may be increased in order to reach farther away giving the unmanned aerial vehicle 8a an earlier warning about the restricted area. As also indicated earlier, such weights and/or output power may, for instance, be updated continuously or upon need.

FIG. 5 illustrates schematically a network entity and means for implementing embodiments of the method in accordance with the present teachings.

The network entity 11 comprises a processor 30 comprising any combination of one or more of a central processing unit (CPU), multiprocessor, microcontroller, digital signal processor (DSP), application specific integrated circuit etc. capable of executing software instructions stored in a memory 31 which can thus be or form part of a computer program product. The processor 31 can be configured to execute any of the various embodiments of the method 20 for instance as described in relation to FIG. 4.

The memory 31 of the network entity 11 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The network entity 11 may comprise an interface 33 for communication with other devices and/or entities. The interface 33 may, for instance, comprise a protocol stack, for communication with other devices or entities. The interface may be used for receiving data input and for outputting data.

The network entity 11 may comprise additional processing circuitry 44 for implementing the various embodiments according to the present teachings.

A network entity 11 is provided for route directing unmanned aerial vehicles. The network entity 11 may be part of or cooperate with a communications system 1 and is configured to:

transmit, to an unmanned aerial vehicle 8a, warning signaling about a restricted area, the unmanned aerial vehicle 8a comprising a communication module 9a for wireless communication with an access node 2a, 2b of the communications system 1.

The network entity 11 may be configured to perform the above step e.g. by comprising one or more processors 30 and memory 31, the memory 31 containing instructions executable by the processor 30, whereby the network entity 11 is operative to perform the step. That is, in an embodiment, a network entity 11 is provided for route directing. The network entity 11 comprises one or more processors and memory, the memory containing instructions executable by the processor, whereby the network entity is operative to transmit, to an unmanned aerial vehicle, warning signaling about a restricted area, the unmanned aerial vehicle comprising a communication module for wireless communication with an access node of the communications system.

In an embodiment, the network entity 11 is configured to:

obtain information on a current position and an intended destination of the unmanned aerial vehicle 8a, determine, based on the obtained information, a route to the destination, the route excluding the restricted area, and signal information on the route to the unmanned aerial vehicle 8a.

In an embodiment, the network entity 11 is configured to:

receive, from the unmanned aerial vehicle 8a, a request for geographical information on the restricted area, and send, in response to the request, the geographical information on the restricted area to the unmanned aerial vehicle 8a.

In various embodiments, the network entity 11 is configured to transmit, to the unmanned aerial vehicle 8a, coordinates of at least one virtual road 10 in airspace along which the unmanned aerial vehicle 8a is to travel.

In various embodiments, the network entity 11 is configured to:

obtain a current position of and a destination for the unmanned aerial vehicle 8a, and determine a route along which the unmanned aerial vehicle 8a is to travel based on the current position, the destination and on predefined virtual roads in airspace.

In a variation of the above embodiment, the network entity 11 is configured to further determine based on one or more of: information on ad hoc demonstrations, information on weather conditions, information on crowds, information on location of other unmanned aerial vehicles 8a, 8b, 8c, 8d and information on traffic accidents.

In different embodiments, the network entity 11 is configured to transmit the warning signaling by broadcasting the warning signaling using a beamforming method.

The present teachings also encompass a computer program 32 for a network entity 11 for route directing. The computer program 32 comprises computer program code, which, when executed on at least one processor on the network entity 11, causes the network entity 11 to perform the method 20 according to any of the described embodiments.

The present teachings also encompass computer program products 21 for a network entity 11. The computer program product 31 comprises the computer program 32 for implementing the embodiments of the methods as described, and a computer readable means on which the computer program 32 is stored. The computer program product, or the memory, thus comprises instructions executable by the processor 30. Such instructions may be comprised in a computer program, or in one or more software modules or function modules. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

FIG. 6 illustrates a network entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A network entity is provided for route directing. The network entity 11 comprises a first module, or first unit, 41 for transmitting, to an unmanned aerial vehicle, warning signaling about a restricted area, the unmanned aerial vehicle comprising a communication module for wireless communication with an access node of the communications system. Such first module 41 may, for instance, comprise transmitting circuitry, antennas and/or an output device.

FIG. 7 illustrates a flow chart over steps of an embodiment of a method in an unmanned aerial vehicle in accordance with the present teachings.

A method 50 of route directing is provided. The method 50 may be performed in an unmanned aerial vehicle 8a, wherein the unmanned aerial vehicle 8a comprises a communication module 9a for wireless communication with an access node 2a, 2b of a communications system 1.

The method 50 comprises receiving 51, from a network entity 11 (e.g. via the access node 2a, 2b), warning signaling about a restricted area, and withdrawing 52 from the restricted area in response to receiving the warning signaling.

The method 50 enables the unmanned aerial vehicle 8a to edge away from a restricted area. The withdrawal from the restricted area may be implemented in different ways. In some embodiments, the unmanned aerial vehicle 8a is configured to stop upon receiving warning signaling and to then back away from the restricted area by reversing its route, i.e. by retreating along the same route as when entering or coming too close to the restricted area. In other embodiments, the unmanned aerial vehicle 8a receives instructions on the further action. The unmanned aerial vehicle 8*a* may, for instance, be directed to its destination along a route not traversing (or in any way entering) the restricted area. The communications system 1 may, for instance, comprise a 3G, LTE or 5G system, and the wireless communication may thus conform to corresponding standards (e.g. 3GPP standards). The communication module 9*a* of the unmanned aerial vehicle 8*a* is configured accordingly.

It is noted that depending on where the network entity 11 is implemented, the unmanned aerial vehicle 8*a* may receive the warning signaling from the network entity 11 via one or more nodes of the communications system 1. As a particular example the network entity 11 is part of the access node 2*a*, 2*b* and the network entity 11 may be configured to send the warning signaling through signaling from the access nodes 2*a*, 2*b*.

In an embodiment, the warning signaling comprises one or both of information on the unmanned aerial vehicle 8*a* entering the restricted area, and information on being within a defined distance from the restricted area.

In different embodiments, the warning signaling comprises one of: broadcast signaling and dedicated signaling.

In various embodiments, the withdrawing 52 comprises receiving, from the network entity 11, signaling comprising route directions to a destination along a route excluding the restricted area. The route directions to the destination are such that the route does not traverse the restricted area, and the unmanned aerial vehicle 8*a* thereby avoids entering the restricted area. In some embodiments, the route is such that it runs on a certain distance from the borders of the restricted area.

In variations of the above embodiments, the method 50 comprises, prior to the receiving the signaling comprising the route directions, transmitting to the network entity 11 information about its current position and information on intended destination. The information about the current position of the unmanned aerial vehicle may, for instance, comprise a global positioning system, GPS, signaling based position, i.e. GPS coordinates. In response to sending such information, the unmanned aerial vehicle then receives the route directions. This saves processing capacity needed in the unmanned aerial vehicle, as the route determination is performed in the network entity 11.

In various embodiments, the withdrawing 52 comprises flying along a route being reverse to the current route. The withdrawing 52 may, for instance, comprise the unmanned aerial vehicle coming to a standstill or hovering and then changing route to exit from a restricted area. In other embodiments, the unmanned aerial vehicle does not come to a standstill, but instead makes a small U-turn thereby changing direction away from the restricted area.

In various embodiments, the withdrawing 52 comprises:

coming to a standstill in air, sending, to the network entity 11, a request for geographical information on the restricted area, and determining, based on the received information, a route to its destination, the route excluding the restricted area.

An advantage of such embodiments is that the unmanned aerial vehicle does not need to share its destination with the network element ii, hence increasing integrity for the owner of the unmanned aerial vehicle 8*a*.

In various embodiments, the withdrawing 52 comprises receiving, from the network entity 11, route directions overriding any other action. An advantage of these embodiments is that the network entity 11 may temporary control the unmanned aerial vehicle 8*a* and instruct it to move out of or away from the restricted area. Thereby it is ensured that the unmanned aerial vehicle 8*a* cannot enter or is removed from the restricted area.

In various embodiments, the method 50 comprises receiving, from the network entity 11, coordinates of at least one virtual road 10 in airspace, and determining a route along which to travel based on the received coordinates of the at least one virtual road 10 and on destination information. In other embodiments, the unmanned aerial vehicle 8*a* receives, from the network entity 11, a route along which to travel, the route comprising at least one virtual road 10. Such virtual roads may be predefined or may be one-time-routes created, e.g. due to an ad-hoc demonstration taking place in an area traversed by the already defined virtual road.

FIG. 8 illustrates schematically an unmanned aerial vehicle and means for implementing embodiments of the method in accordance with the present teachings.

The unmanned aerial vehicle 8*a* comprises a processor 60 comprising any combination of one or more of a central processing unit (CPU), multiprocessor, microcontroller, digital signal processor (DSP), application specific integrated circuit etc. capable of executing software instructions stored in a memory 61 which can thus be or form part of a computer program product. The processor 60 can be configured to execute any of the various embodiments of the method 50 for instance as described in relation to FIG. 7.

The memory 61 of the unmanned aerial vehicle 8*a* can be any combination of read and write memory (RAM) and read only memory (ROM), Flash memory, magnetic tape, Compact Disc (CD)-ROM, digital versatile disc (DVD), Blu-ray disc etc. The memory 61 may also comprise persistent storage, which, for example, can be any single one or combination of magnetic memory, optical memory, solid state memory or even remotely mounted memory.

The unmanned aerial vehicle 8*a* may comprise an interface 9*a* for communication with other devices and/or entities. The interface 9*a* may, for instance, comprise a protocol stack, for communication with other devices or entities, for instance with the access nodes 2*a* of the communications system 1. The interface may be used for receiving data input and for outputting data, antenna devices, receiving circuitry and/or transmitting circuitry.

The unmanned aerial vehicle 8*a* may comprise a GPS 62, as has been described earlier.

The unmanned aerial vehicle 8*a* may comprise additional processing circuitry 63 for implementing the various embodiments according to the present teachings.

An unmanned aerial vehicle 8*a* is provided for route directing, the unmanned aerial vehicle 8*a* comprising a communication module 9*a* for wireless communication with an access node 2*a*, 2*b* of a communications system. The unmanned aerial vehicle 8*a* is configured to:

receive, from a network entity 11, warning signaling about a restricted area, and withdraw from the restricted area in response to receiving the warning signaling.

The unmanned aerial vehicle 8*a* may be configured to perform the above steps e.g. by comprising one or more processors 60 and memory 61, the memory 61 containing instructions executable by the processor 60, whereby the unmanned aerial vehicle 8*a* is operative to perform the steps. That is, in an embodiment, an unmanned aerial vehicle 8*a* is provided for route directing. The unmanned aerial vehicle 8*a* comprises one or more processors and memory, the memory containing instructions executable by the processor, whereby the unmanned aerial vehicle 8*a* is operative to: receive, from a network entity, warning signaling about a restricted area, and withdraw from the restricted area in response to receiving the warning signaling.

In an embodiment, the warning signaling comprises one or both of information on the unmanned aerial vehicle 8a entering the restricted area, and information on being within a defined distance from the restricted area.

In different embodiments, the warning signaling comprises one of: broadcast signaling and dedicated signaling.

In various embodiments, the unmanned aerial vehicle 8a is configured to withdraw by receiving, from the network entity 11, signaling comprising route directions to a destination along a route excluding the restricted area.

In a variation of the above embodiments, the unmanned aerial vehicle 8a is configured to, prior to the receiving the signaling comprising the route directions, transmit to the network entity 11 information about its current position and information on intended destination.

In various embodiments, the unmanned aerial vehicle 8a is configured to withdraw by flying along a route being reverse to the current route.

In various embodiments, the unmanned aerial vehicle 8a is configured to withdraw by:

coming to a standstill in air, sending, to the network entity 11, a request for geographical information on the restricted area, and determining, based on the received information, a route to its destination, the route excluding the restricted area.

In various embodiments, the unmanned aerial vehicle 8a is configured to withdraw by receiving, from the network entity 11, route directions overriding any other action.

In various embodiments, the unmanned aerial vehicle 8a is configured to receive, from the network entity 11, coordinates of at least one virtual road 10 in airspace, and to determine a route along which to travel based on the received coordinates of the at least one virtual road 10 and on destination information.

The present teachings also encompass a computer program 62 for an unmanned aerial vehicle for route directing. The computer program 62 comprises computer program code, which, when executed on at least one processor on the unmanned aerial vehicle, causes the unmanned aerial vehicle to perform the method 50 according to any of the described embodiments.

The present teachings also encompass computer program products 51 for an unmanned aerial vehicle. The computer program product 51 comprises the computer program 52 for implementing the embodiments of the methods as described, and a computer readable means on which the computer program 52 is stored. The computer program product, or the memory, thus comprises instructions executable by the processor 50. Such instructions may be comprised in a computer program, or in one or more software modules or function modules. The computer program product 51 may, as mentioned earlier, be any combination of random access memory (RAM) or read only memory (ROM), Flash memory, magnetic tape, Compact Disc (CD)-ROM, digital versatile disc (DVD), Blu-ray disc etc.

FIG. 9 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

An unmanned aerial vehicle is provided for route directing. The unmanned aerial vehicle comprises a first module 71 for receiving, from a network entity, warning signaling about a restricted area. Such first module 71 may, for instance, comprise receiving circuitry and/or antenna device and/or an input device.

The unmanned aerial vehicle comprises a second module 72 for withdrawing from the restricted area in response to receiving the warning signaling. Such second module 72 may, for instance, comprise processing circuitry adapted to act on received warning signaling. For instance, the second module 72 may comprises processing circuitry adapted to reverse the flying direction in response to receiving warning signaling.

It is noted that one or both of the modules 71, 72 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of directing an unmanned aerial vehicle (UAV) flying in a particular direction towards a destination, the method being performed in a network entity of a communications system, wherein the network entity is separate from the UAV, and comprising:

the network entity determining a location of the UAV;

based on the determined location of the UAV, the network entity determining whether a criteria is satisfied;

as a result of determining that the criteria is satisfied, the network entity transmitting to the UAV a warning message for indicating to the UAV that the UAV must change its velocity;

obtaining position information identifying the UAV's current position;

obtaining information identifying the destination for the UAV;

defining a plurality of three dimensional roads, wherein each of the three dimensional roads corresponds to a different volume of airspace;

selecting one of the plurality of three dimensional roads; and calculating a route along which the unmanned aerial vehicle is to travel using: the position information, the destination information, and the volume of airspace corresponding to the selected three dimensional road.

2. The method of claim 1, further comprising:

obtaining information on a current position and an intended destination of the unmanned aerial vehicle;

determining, based on the obtained information, a route to the destination, the route excluding a restricted area; and signaling information on the route to the unmanned aerial vehicle.

3. The method of claim 1, further comprising:

receiving, from the unmanned aerial vehicle, a request for geographical information on a restricted area; and sending, in response to the request, the geographical information on the restricted area to the unmanned aerial vehicle.

4. The method of claim 1, further comprising transmitting to the unmanned aerial vehicle information identifying a three dimensional road.

5. A computer program product comprising a non-transitory computer readable medium storing a computer program for a network entity for route directing unmanned aerial vehicles, the computer program comprising computer program code, which, when executed on at least one processor on the network entity causes the network entity to perform the method of claim 1.

6. A network entity of route directing unmanned aerial vehicles (UAVs), the network entity being part of a communications system, and being configured to:

detect that the network entity should broadcast a warning message about a restricted area; and broadcast the warning message, wherein the network entity is further configured to shape the coverage area of the broadcast warning message such that the coverage area of the broadcast warning message aligns with the restricted area, the network entity comprises a plurality of antenna elements, the network entity is configured to shape the coverage area of the broadcast warning message by applying complex weights on the plurality of antenna elements, and the network entity is further configured to update the complex weights based on information indicating the positions of one or more UAVs that have received the warning message.

* * * * *